(12) United States Patent
Ramadass et al.

(10) Patent No.: US 10,784,777 B2
(45) Date of Patent: Sep. 22, 2020

(54) OUTPUT CURRENT BOOSTING OF CAPACITOR-DROP POWER SUPPLIES

(71) Applicant: TEXAS INSTRUMENTS INCORPORATED, Dallas, TX (US)

(72) Inventors: Yogesh Kumar Ramadass, San Jose, CA (US); Jeffrey Morroni, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/224,457

(22) Filed: Dec. 18, 2018

(65) Prior Publication Data

US 2019/0207513 A1 Jul. 4, 2019

Related U.S. Application Data

(60) Provisional application No. 62/611,009, filed on Dec. 28, 2017.

(51) Int. Cl.
*H02M 3/07* (2006.01)
*H02M 1/00* (2006.01)
*H02M 7/219* (2006.01)

(52) U.S. Cl.
CPC .............. *H02M 3/07* (2013.01); *H02M 1/00* (2013.01); *H02M 7/219* (2013.01); *H02M 2001/007* (2013.01); *H02M 2001/0045* (2013.01)

(58) Field of Classification Search
CPC .......... H02M 3/02; H02M 3/07; H02M 3/158; H02M 3/1588; H02M 3/335; H02M 1/00; H02M 7/219; H02M 2001/007; H02M 2001/0045; H02M 2001/0058; H02M 2001/0077
USPC ......................... 363/126, 219, 271, 299, 312
See application file for complete search history.

(56) References Cited

U.S. PATENT DOCUMENTS

| 5,659,314 | A | * | 8/1997 | Tokura | H03M 3/43 341/143 |
|---|---|---|---|---|---|
| 6,373,790 | B1 | * | 4/2002 | Fujisawa | H02J 7/027 320/134 |
| 7,907,429 | B2 | * | 3/2011 | Ramadass | H02M 3/07 307/110 |
| 9,991,794 | B2 | * | 6/2018 | Lueders | H02M 3/158 |
| 10,034,334 | B2 | * | 7/2018 | Jiang | H02M 3/158 |
| 10,199,928 | B1 | * | 2/2019 | Wiedenbauer | H02M 3/06 |
| 10,224,803 | B1 | * | 3/2019 | Rainer | H02M 3/335 |
| 2011/0234305 | A1 | * | 9/2011 | Lesso | H02M 3/07 327/536 |
| 2014/0071722 | A1 | * | 3/2014 | Gao | H02M 7/2176 363/80 |
| 2014/0184189 | A1 | * | 7/2014 | Salem | H02M 3/07 323/299 |

(Continued)

*Primary Examiner* — Yemane Mehari
(74) *Attorney, Agent, or Firm* — Brian D. Graham; Charles A. Brill; Frank D. Cimino

(57) ABSTRACT

A capacitor-drop power supply includes a rectifier and a switched capacitor converter coupled to the rectifier. The rectifier is configured to receive an alternating current (AC) signal at an AC voltage and convert the AC signal into a rectified direct current (DC) signal at a rectified voltage. The switched capacitor converter is configured to receive the rectified DC signal and generate a converter output signal at a converter voltage that is proportional to the rectified voltage and that is less than the AC voltage.

20 Claims, 4 Drawing Sheets

(56) References Cited

U.S. PATENT DOCUMENTS

| | | | |
|---|---|---|---|
| 2018/0026518 A1* | 1/2018 | Liu | H02M 3/1584 |
| | | | 323/312 |
| 2018/0034302 A1* | 2/2018 | Van Den Berg | H02J 7/025 |
| 2018/0212531 A1* | 7/2018 | Hurwitz | H02M 7/217 |
| 2019/0115834 A1* | 4/2019 | Hu | H02M 3/07 |
| 2019/0207513 A1* | 7/2019 | Ramadass | H02M 1/00 |
| 2019/0207532 A1* | 7/2019 | Ramadass | H02M 7/219 |
| 2019/0372454 A1* | 12/2019 | Rainer | H02M 3/158 |

* cited by examiner

OUTPUT CURRENT BOOSTING OF CAPACITOR-DROP POWER SUPPLIES

CROSS-REFERENCE TO RELATED APPLICATION

This application claims priority, and incorporates by reference, U.S. Provisional Appln. No. 62/611,009 entitled "OUTPUT CURRENT BOOSTING OF CAPACITOR-DROP POWER SUPPLIES" filed Dec. 28, 2017.

BACKGROUND

Capacitor-drop power supplies generate a supply voltage (e.g., a direct current (DC) voltage) for circuits that is lower than the mains voltage (e.g., an alternating current (AC) voltage received from a wall socket; line voltage) by utilizing the capacitive reactance of a capacitor. In other words, capacitor-drop power supplies take the mains voltage and generate a lower voltage level DC signal utilizing a capacitor. Capacitor-drop power supplies are typically utilized in low-power applications such as electricity meters (e-meters) and other low power systems.

SUMMARY

In accordance with at least one embodiment of the disclosure, a capacitor-drop power supply includes a rectifier and a switched capacitor converter coupled to the rectifier. The rectifier is configured to receive an alternating current (AC) signal at an AC voltage and convert the AC signal into a rectified direct current (DC) signal at a rectified voltage. The switched capacitor converter is configured to receive the rectified DC signal and generate a converter output signal at a converter voltage that is proportional to the rectified voltage and that is less than the AC voltage.

Another illustrative embodiment is a switched capacitor converter for a capacitor-drop power supply. The switched capacitor converter includes a capacitor switching circuit and a control circuit. The capacitor switching circuit is configured to receive a rectified DC signal at a first voltage level and a first current level from a rectifier circuit and generate a converter output signal at a second voltage level and a second current level. The first voltage level is greater than the second voltage level and the first current level is less than the second current level. The control circuit is configured to control a plurality of switches within the capacitor switching circuit to generate the converter output signal as a direct current.

Yet another illustrative embodiment is a method of generating a DC signal in a capacitor-drop power supply. The method includes receiving an AC signal at an AC voltage. The method also includes converting, by a rectifier, the AC signal into a rectified DC signal at a rectified voltage and a rectified current. The method also includes generating, by a switched capacitor converter, a converter output signal at a converter current that is proportional to the rectified current, a converter voltage that is proportional to the rectified voltage and that is less than the AC voltage. The method also includes generating a regulated output signal based on the converter output signal to drive a load.

BRIEF DESCRIPTION OF THE DRAWINGS

For a detailed description of various examples, reference will now be made to the accompanying drawings in which.

DETAILED DESCRIPTION

In this description, the term "couple" or "couples" means either an indirect or direct connection. Thus, if a first device couples to a second device, that connection may be through a direct connection, or through an indirect connection via other devices and connections. Also, in this description, the recitation "based on" means "based at least in part on." Therefore, if X is based on Y, then X may be based on Y and any number of other factors.

Capacitor-drop power supplies generate a supply voltage (e.g., a direct current (DC) voltage) for circuits that is lower than the mains voltage (e.g., an alternating current (AC) voltage received from a wall socket) by utilizing the capacitive reactance of a capacitor. In other words, capacitor-drop power supplies take the mains voltage and generate a lower voltage level DC voltage utilizing a capacitor. Capacitor-drop power supplies are typically utilized in low-power applications such as electricity meters (e-meters) and other low power systems.

Conventional capacitor-drop power supplies utilize a high voltage capacitor in series with a Zener diode to generate a lower voltage level DC signal. The voltage of the AC signal from the mains voltage drops across the high voltage capacitor, and the Zener diode acts to clamp the lower voltage level DC signal to the lower voltage level (e.g., 5V, 3V, etc.). A linear regulator then can regulate the resulting signal to drive a load. However, such a conventional capacitor-drop's non-isolated offline bias supply is dominated in size and cost by the high voltage capacitor used to drop the AC voltage. Additionally, the input current drawn directly affects the no-load quiescent power due to the presence of input current limiting resistors. Thus, it would be desirable for a capacitor-drop power supply to utilize smaller size high voltage capacitors to reduce size and cost while still generating the same output current to drive the load.

In accordance with various examples, a capacitor-drop power supply utilizes a smaller (lower value) input high voltage capacitor compared with conventional systems. More particularly, the capacitor-drop power supply uses a switched capacitor converter between the rectifier and the linear regulator. Therefore, the regulator can utilize a smaller input high voltage capacitor because the AC signal can be dropped to a higher level than in the conventional system. The switched capacitor converter then further drops the voltage while increasing the current, so that the converter output signal has a similar voltage and current level as the conventional system but with smaller capacitors. Therefore, the system has a reduced size and cost while still generating the same output current to drive the load as the conventional system.

Figure 1:
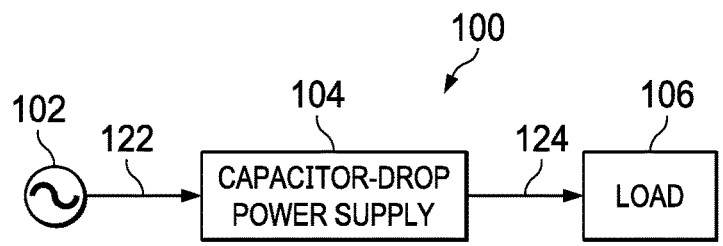
FIG. 1 shows an illustrative block diagram of a power supply system in accordance with various examples.

FIG. 1 shows an illustrative block diagram of a power supply system 100 in accordance with various examples. The power supply system 100 includes, in an embodiment, an AC power source 102, a capacitor-drop power supply 104, and a load 106. The AC power source 102 is configured to generate an AC signal 122 at an AC voltage. For example, the AC power source 102 can be mains electricity that is provided through a socket in the wall at a voltage of 120V and a frequency of 60 Hz, 230V and a frequency of 50 Hz, and/or 230V and a frequency of 60 Hz. In other examples, the AC power source 102 can generate and provide AC signal 122 at any AC voltage and frequency.

The capacitor-drop power supply 104 is configured, in an embodiment, to receive the AC signal 122 and generate a regulated output signal 124 to drive load 106. The regulated output signal 124 is a DC signal that has a voltage that is less than the AC voltage in the AC signal 122. For example, the capacitor-drop power supply 104 can receive the AC signal 122 at 120V, convert the AC signal 122 into a DC signal, and generate a DC regulated output signal 124 at 3V or 5V to provide power to load 106. The load 106 can be any electrical circuitry that is powered by regulated output signal 124.

Figure 2:
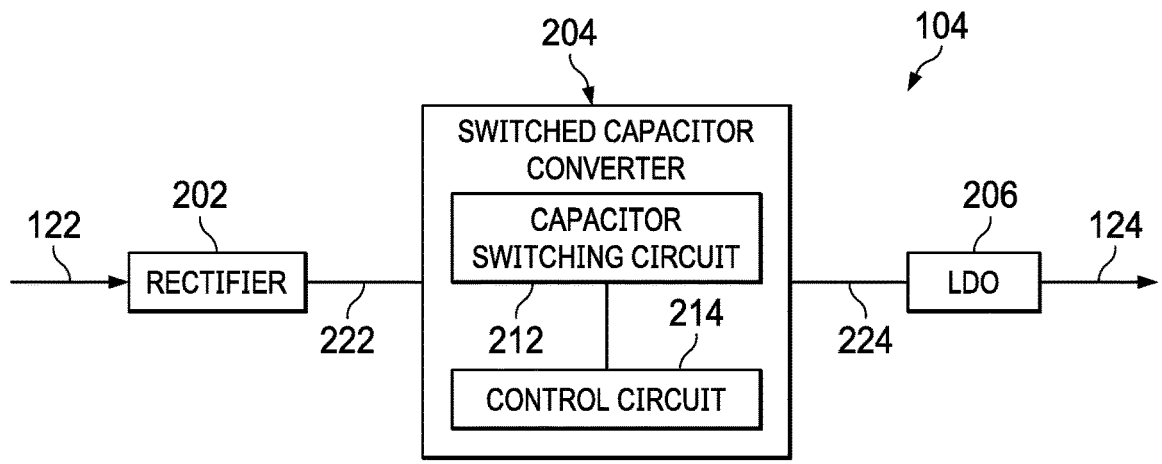
FIG. 2 shows an illustrative block diagram of a capacitor-drop power supply in accordance with various examples.

FIG. 2 shows an illustrative block diagram of capacitor-drop power supply 104 in accordance with various examples. The capacitor-drop power supply 104 includes, in an embodiment, a rectifier 202 a switched capacitor converter 204, and a low-dropout regulator (LDO) 206. The rectifier 202 is configured to receive the AC signal 122 and convert the AC signal 122 into a rectified DC signal 222 at a rectified voltage. For example, the rectifier 202 can receive the AC signal 122 at 120V and convert the AC signal 122 into rectified DC signal 222 at a rectified voltage of approximately 20V.

The switched capacitor converter 204, which in some embodiments includes a capacitor switching circuit 212 and a control circuit 214, is configured to receive the rectified DC signal 222 from the rectifier 202 and generate converter output signal 224 at a converter voltage that is proportional to the rectified voltage (the voltage of the rectified DC signal 222). Thus, the switched capacitor converter 204 can act as a voltage drop converter that drops the voltage of the rectified DC signal 222 by N times (e.g., a N:1 switched capacitor converter) to generate the converter output signal 224 at a voltage that is N times less than the voltage of the rectified DC signal 222. At the same time, the switched capacitor converter 204 can act to increase the current of the rectified DC signal 222 by the same N times to generate the converter output signal 224 at a current that is N times greater than the current of the rectified DC signal 222.

For example, the capacitor switching circuit 212 can receive the rectified DC signal 222 and generate the converter output signal 224 at a voltage that is four times (N equals four) less than the rectified DC signal 222. Thus, if the rectified DC signal 222 is 20V, then the generated converter output signal 224 voltage can be approximately 5V. In other words, the capacitor switching circuit 212 generates a lower voltage DC converter output signal 224 than the rectified DC signal 222 based on the voltage level of the rectified DC signal 222 and the design (e.g., number of flying capacitors and switches) of the capacitor switching circuit 212. The control circuit 214 controls the operation of the capacitor switching circuit 212 by generating control signals that cause the switches of the capacitor switching circuit 212 to open and close, thus generating the converter output signal 224. The switched capacitor converter 204 can be implemented as any type of switched capacitor converter (e.g., a Dickson DC-DC converter, a series-parallel DC-DC converter, a Fibonacci DC-DC converter, etc.).

The LDO 206 is configured to receive the converter output signal 224 and regulate the converter output signal 224 to generate the regulated output signal 124 that drives load 106. In other words, the LDO 206 acts to maintain a constant output voltage in the regulated output signal 124. While the LDO 206 is shown in FIG. 2, other types of regulators (e.g., any linear regulator, a switching regulator, etc.) may be utilized. Furthermore, in some embodiments, the converter output signal 224 directly drives the load 106 without an intervening regulator.

Figure 3:
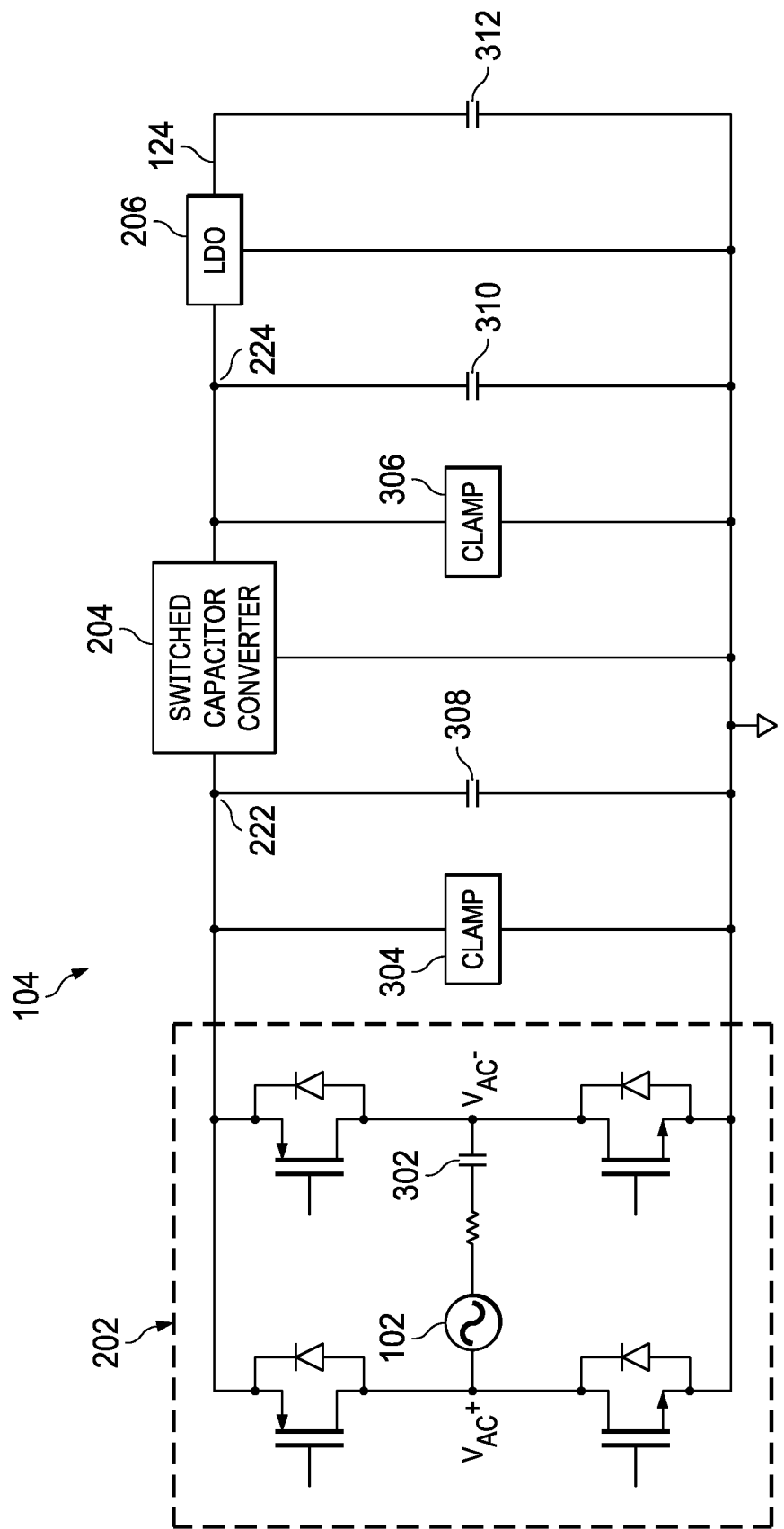
FIG. 3 shows an illustrative circuit diagram of a capacitor-drop power supply in accordance with various examples.

FIG. 3 shows an illustrative circuit diagram of capacitor-drop power supply 104 in accordance with various examples. As discussed above, in an embodiment, the capacitor-drop power supply 104 includes the rectifier 202, the switched capacitor converter 204, and the LDO 206. The rectifier 202 includes, in some embodiments, a bridge rectifier structure (e.g., a diode bridge) and a capacitor 302. As shown in FIG. 3, the AC power source 102 generates the AC signal 122 with a positive component (VAC+) and a negative component (VAC−). Utilizing the capacitor 302 and the diode bridge, the rectifier generates the rectified DC signal 222. In some embodiments, clamp 304 is configured to clamp (e.g., limit) the rectified DC signal 222 to a desired voltage (e.g., 20V). The capacitor 308 is configured, in some embodiments, to ensure that a constant rectified DC signal 222 is provided to the switched capacitor converter 204.

As discussed above, the switched capacitor converter 204 receives the rectified DC signal 222 and generates the converter output signal 224. Clamp 306, in some embodiments, is configured to clamp the converter output signal 224 to a desired voltage (e.g., 5V). The capacitor 310 is configured, in some embodiments, to ensure that a constant converter output signal 224 is provided to the LDO 206. As discussed above, the LDO 206 receives the converter output signal 224 and generates the regulated output signal 124. The capacitor 312, in some embodiments, is configured to ensure that a constant regulated output signal 124 is provided to the load 106.

Figure 4A:
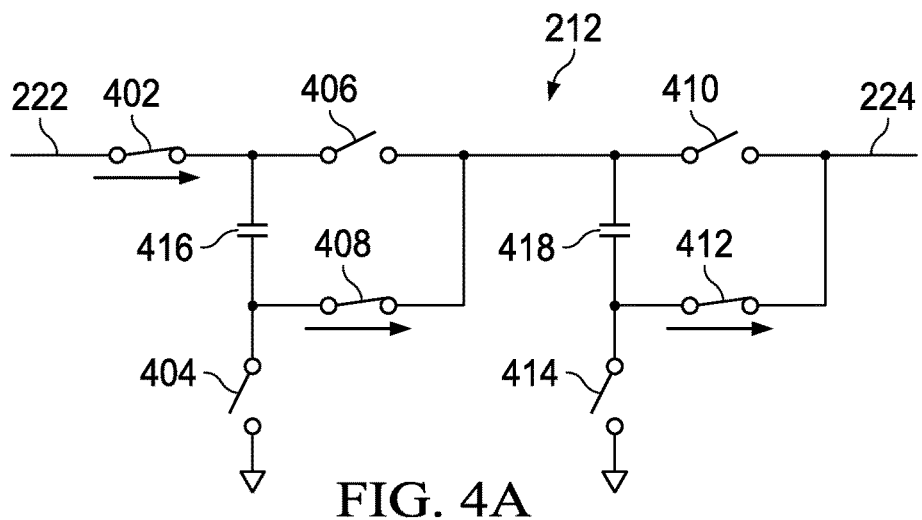
FIG. 4A shows an illustrative circuit diagram of a capacitor switching circuit in a switched capacitor converter of a capacitor-drop power supply in accordance with various examples.
Figure 4B:
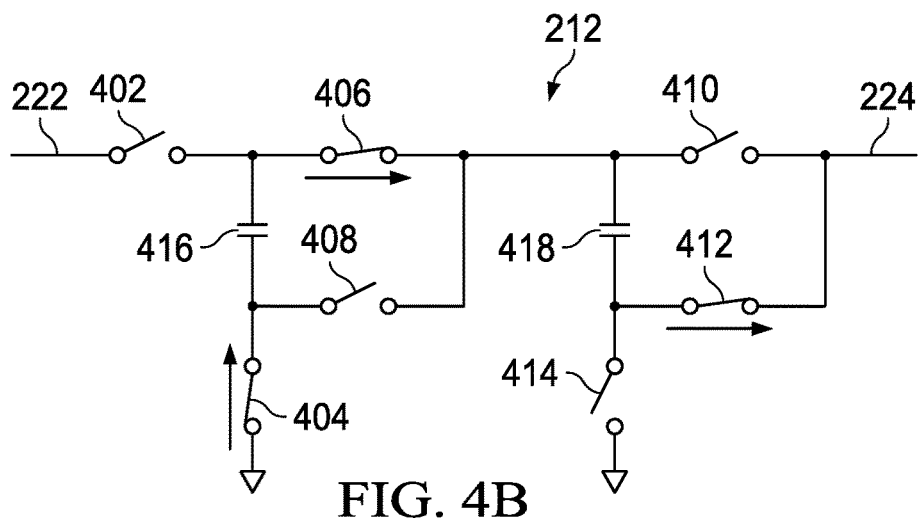
FIG. 4B shows an illustrative circuit diagram of a capacitor switching circuit in a switched capacitor converter of a capacitor-drop power supply in accordance with various examples.
Figure 4C:
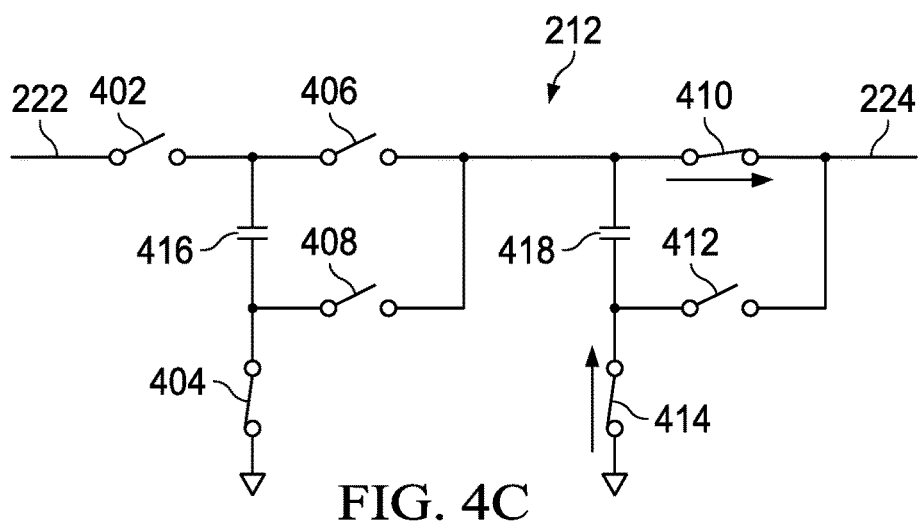
FIG. 4C shows an illustrative circuit diagram of a capacitor switching circuit in a switched capacitor converter of a capacitor-drop power supply in accordance with various examples.

FIGS. 4A-4C shows an illustrative circuit diagram of capacitor switching circuit 212 of switched capacitor converter 204 of capacitor-drop power supply 104 in accordance with various examples. More particularly, FIGS. 4A-4C show one example of the switching sequencing of the switches 402-414 of an example 4:1 capacitor switching circuit. In some embodiments, such a capacitor switching circuit 212 includes switches 402-414 and flying capacitors 416-418. More particularly, the capacitor switching circuit 212 can include flying capacitor 416 in series with switches 402-408 and flying capacitor 418 in series with switches 406-414.

As shown in FIG. 4A, in the first part of the sequence (the charge phase), the control circuit 214 generates control signals that cause the switches 402, 408, 412 to be closed and switches 404, 406, 410, and 414 to be open. This causes the rectified DC voltage 402 to charge the flying capacitor 416, flow through the switch 408, charge the flying capacitor 418, and flow through the switch 412 to generate the converter output signal 224. In other words, the flying capacitors 416-418 and the output (converter output signal 224) are configured to be in series with the input (rectified DC signal 222). As shown in FIG. 4B, in the second part of the sequence (the discharge of flying capacitor 416 phase), the control circuit 214 generates control signals that cause the switches 404, 406, and 412 to be closed and switches 402, 408, 410, and 414 to be open. This causes the charge stored in flying capacitor 416 to discharge through switch 406 while continuing to charge flying capacitor 418 and flow through switch 412 to generate the converter output signal 224. In other words, the flying capacitor 418 and the output (converter output signal 224) are configured to be in series with the discharging flying capacitor 416. As shown in FIG. 4C, in the third part of the sequence (the flying capacitor 418 discharge phase), the control circuit 214 generates control signals that cause the switches 404, 410, and 414 to be closed and switches 402, 406, 408, and 412 the be open. This causes the charge stored in flying capacitor 418 to discharge through switch 410 to generate the converter output signal 224. In other words, the output (converter output signal 224) is placed in series with the discharging flying capacitor 418. In this way, the capacitor switching circuit 212 generates the converter output signal 224 as a 4:1 stepdown DC-DC converter. However, as discussed above, in alternative embodiments, the capacitor switching circuit 212 can be implemented in any configuration to step down, in any proportion (e.g., N:1) the rectified DC signal 222.

Figure 5:
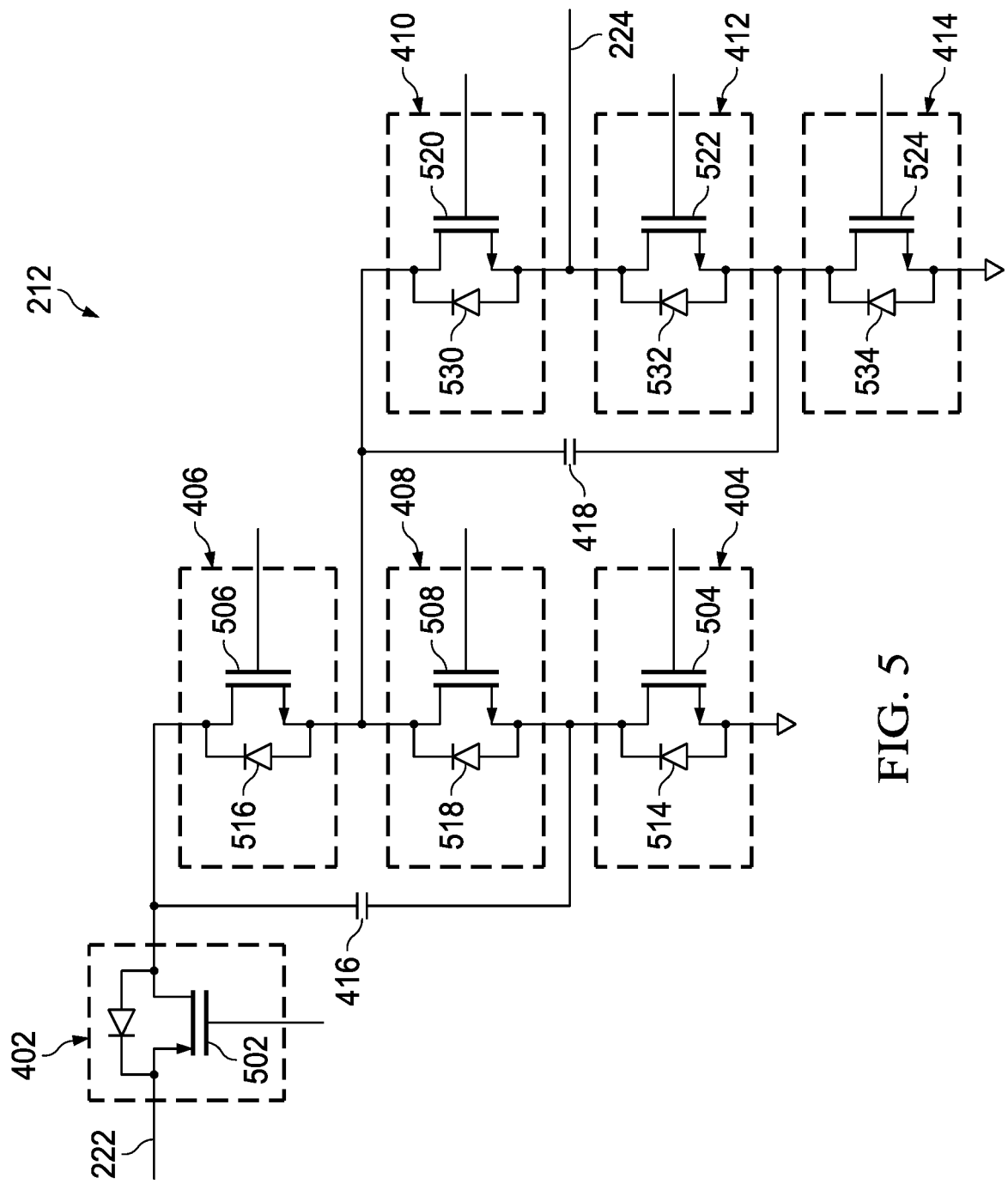
FIG. 5 shows an illustrative circuit diagram of a capacitor switching circuit in a switched capacitor converter of a capacitor-drop power supply in accordance with various examples.

FIG. 5 shows an illustrative circuit diagram of capacitor switching circuit 212 of switched capacitor converter 204 of capacitor-drop power supply 104 in accordance with various examples. More particularly, FIG. 5 shows an example field-effect transistor (FET) implementation of the switches 402-414 of an example 4:1 capacitor switching circuit. In some embodiments, each of the switches 402-414 includes a metal-oxide-semiconductor FET (MOSFET) and a diode. For example, switch 402 includes transistor 502 and diode 402. Switch 404 includes transistor 504 and diode 514. Switch 406 includes transistor 506 and diode 516. Switch 408 includes transistor 508 and diode 518. Switch 410 includes transistor 520 and diode 530. Switch 412 includes transistor 522 and diode 532. Switch 414 includes transistor 524 and diode 534. In some embodiments, the transistor 502 is a p-channel MOSFET (PMOS) transistor; however, in alternative embodiments, the transistor 502 can be an n-channel MOSFET (NMOS) transistor, or a bipolar junction transistor (BJT). In some embodiments, the transistors 504-508 and 520-524 are NMOS transistors; however, in alternative embodiments, the transistors 504-508 and 520-524 are PMOS transistors or BJTs. The control circuit 214 is configured, in an embodiment, to drive the gates of the transistors 502-508 and 520-524 thereby causing the switches 402-414 to open and close as discussed above to generate the converter output signal 224.

In an embodiment, the source of transistor 502 is configured to receive the rectified DC signal 222 while the drain of the transistor 502 is directly connected to the flying capacitor 416 and the drain of transistor 506. The source of transistor 506 is directly connected to the drain of transistor 508, the flying capacitor 418 and the drain of transistor 520. The source of transistor 508 is directly connected to the flying capacitor 416 and the drain of transistor 504. The source of transistor 504 is directly connected to ground. The source of transistor 520 is directly connected to the drain of transistor 522 and is configured to generate the converter output signal 224. The source of transistor 522 is directly connected to the flying capacitor 418 and the drain of transistor 524. The source of transistor 524 is directly connected to ground. In this way, the capacitor switching circuit 212 can be implemented utilizing FETs.

Figure 6:
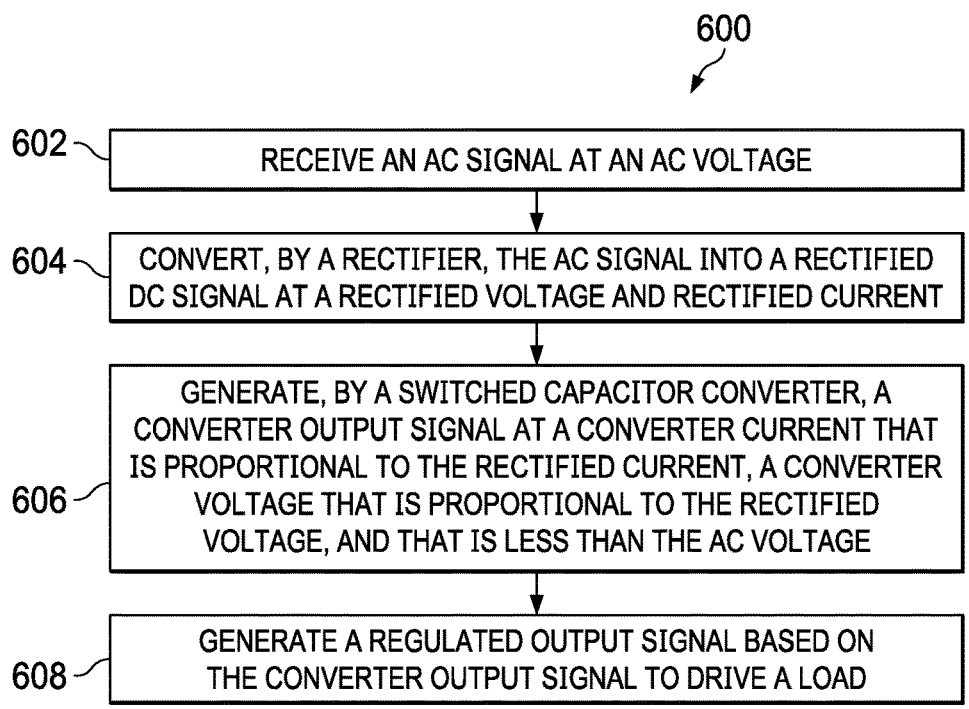
FIG. 6 shows an illustrative flow diagram of a method of generating a DC signal in a capacitor-drop power supply in accordance with various examples.

FIG. 6 shows an illustrative flow diagram of a method 600 of generating a DC signal in a capacitor-drop power supply in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, are performed by the capacitor-drop power supply 104 and more particularly by the rectifier 202, the switched capacitor converter 204 (including the capacitor switching circuit 212 and/or the control circuit 214), and/or the LDO 206 and implemented in logic.

The method 600 begins in block 602 with receiving an AC signal at an AC voltage. For example, the rectifier 202 can receive the AC signal 122 at an AC voltage (e.g., 120V) from the AC power source 102. In block 604, the method 600 continues with converting the AC signal into a rectified DC signal at a rectified voltage and rectified current. For example, the rectifier 202 can convert the AC signal 122 into the rectified DC signal 222 at a rectified voltage (e.g., 20V) and a rectified current.

The method 600 continues in block 606 with generating a converter output signal at a converter current that is proportional to the rectified current, a converter voltage that is proportional to the rectified voltage and that is less than the AC voltage. For example, the switched capacitor converter 204 can receive the rectified DC signal 202 from rectifier 202 and generate the converter output signal 224 at a voltage that is proportionally less than the rectified voltage (e.g., four times less when N=4 in an N:1 switched capacitor converter) and at a current that is proportionally more than the rectified current (e.g., four times more when N=4 in and N:1 switched capacitor converter).

In block 608, the method 600 continues with generating a regulated output signal based on the converter output signal to drive a load. For example, the LDO 206 can receive the converter output signal 224 and generate the regulated output signal 124 by regulating the converter output signal 224.

Modifications are possible in the described embodiments, and other embodiments are possible, within the scope of the claims

What is claimed is:
1. A capacitor-drop power supply, comprising:
   a rectifier configured to receive an alternating current (AC) signal at an AC voltage and convert the AC signal into a rectified direct current (DC) signal at a rectified voltage;
   a switched capacitor converter coupled to the rectifier, the switched capacitor converter configured to:
      receive the rectified DC signal; and
      generate a converter output signal at a converter voltage that is proportional to the rectified voltage and that is less than the AC voltage; and
   a clamp coupled to the switched capacitor converter, the clamp configured to clamp the converter output signal to a limited voltage.

2. The capacitor-drop power supply of claim 1, further comprising a low-dropout regulator (LDO) configured to receive the converter output signal and generate a regulated output signal to drive a load.

3. The capacitor-drop power supply of claim 1, wherein the switched capacitor converter is configured to generate the converter output signal with the converter voltage being less than the rectified voltage.

4. The capacitor-drop power supply of claim 3, wherein the switched capacitor converter is configured to generate the converter output signal with the converter voltage being four times less than the rectified voltage.

5. The capacitor-drop power supply of claim 1, wherein the switched capacitor converter includes a first flying capacitor connected in series with a first switch, a second switch, a third switch, and a fourth switch.

6. The capacitor-drop power supply of claim 5, wherein the switched capacitor converter further includes a second flying capacitor connected in series with the second switch, the third switch, a fifth switch, a sixth switch, and a seventh switch.

7. The capacitor-drop power supply of claim 6, wherein:
the first switch includes a first transistor that includes a first gate, a first source, and a first drain;
the second switch includes a second transistor that includes a second gate, a second source, and a second drain;
the third switch includes a third transistor that includes a third gate, a third source, and a third drain;
the fourth switch includes a fourth transistor that includes a fourth gate, a fourth source, and a fourth drain;
the fifth switch includes a fifth transistor that includes a fifth gate, a fifth source, and a fifth drain;
the sixth switch includes a sixth transistor that includes a sixth gate, a sixth source, and a sixth drain; and
the seventh switch includes a seventh transistor that includes a seventh gate, a seventh source, and a seventh drain.

8. The capacitor-drop power supply of claim 7, wherein:
the first source is configured to receive the rectified DC signal;
the first drain is directly connected to the first flying capacitor and the second drain;
the second source is directly connected to the third drain; and
the fourth drain is directly connected to the third source and the first flying capacitor.

9. The capacitor-drop power supply of claim 8, wherein:
the second source and the third drain are further directly connected to the second flying capacitor and the fifth drain;
the fifth source is directly connected to the sixth drain and is configured to generate the converter output signal; and
the seventh drain is directly connected to the sixth source and the second flying capacitor.

10. The capacitor-drop power supply of claim 1, wherein the switched capacitor converter is implemented as a Dickson DC-DC converter, a series-parallel DC-DC converter, or a Fibonacci DC-DC converter.

11. A switched capacitor converter for a capacitor-drop power supply, comprising:
a capacitor switching circuit including:
a first switch having a first drain and a first source;
a second switch having a second drain and a second source, the first drain directly coupled to the second drain;
a third switch having a third drain and a third source, the third drain directly coupled to the second source;
a first flying capacitor coupled to the first drain, the second drain, and the third source;
a fourth switch coupled to the first flying capacitor and coupled to the third switch;
a fifth switch having a fifth drain and a fifth source, the fifth drain directly coupled to the second source and the third drain;
a second flying capacitor coupled to the second source, the third drain, and the fifth drain;
the capacitor switching circuit configured to:
receive a rectified direct current (DC) signal at a first voltage level and a first current level from a rectifier circuit; and
generate a converter output signal at a second voltage level and a second current level; and
a control circuit configured to control a plurality of switches within the capacitor switching circuit to generate the converter output signal as a direct current, wherein the first voltage level is greater than the second voltage level and the first current level is less than the second current level.

12. The switched capacitor converter of claim 11, wherein the first voltage level is N times greater than the second voltage level, and the first current level is N times less than the second current level.

13. The switched capacitor converter of claim 12, wherein N is four.

14. The switched capacitor converter of claim 11, wherein the capacitor switching circuit includes:
the first flying capacitor connected in series with the first switch, the second switch, the third switch, and the fourth switch; and
the second flying capacitor connected in series with the second switch, the third switch, the fifth switch, a sixth switch, and a seventh switch.

15. The switched capacitor converter of claim 14, wherein:
the first switch includes a first transistor that includes a first gate, the first source, and the first drain;
the second switch includes a second transistor that includes a second gate, the second source, and the second drain;
the third switch includes a third transistor that includes a third gate, the third source, and the third drain;
the fourth switch includes a fourth transistor that includes a fourth gate, a fourth source, and a fourth drain;
the fifth switch includes a fifth transistor that includes a fifth gate, the fifth source, and the fifth drain;
the sixth switch includes a sixth transistor that includes a sixth gate, a sixth source, and a sixth drain; and
the seventh switch includes a seventh transistor that includes a seventh gate, a seventh source, and a seventh drain.

16. The switched capacitor converter of claim 15, wherein:
the first source is configured to receive the rectified DC signal;
the first drain is directly connected to the first flying capacitor and the second drain;
the fourth drain is directly connected to the third source and the first flying capacitor;
the second source and the third drain are directly connected to the second flying capacitor and the fifth drain;

the fifth source is directly connected to the sixth drain and is configured to generate the converter output signal; and the seventh drain is directly connected to the sixth source and the second flying capacitor.

17. The switched capacitor converter of claim 15, wherein the control circuit is configured to generate control signals to drive the first gate, the second gate, the third gate, the fourth gate, the fifth gate, the sixth gate, and the seventh gate.

18. A method of generating a direct current (DC) signal in a capacitor-drop power supply, comprising:
receiving an alternating current (AC) signal at an AC voltage;
converting, by a rectifier, the AC signal into a rectified DC signal at a rectified voltage and a rectified current;
generating, by a switched capacitor converter, a converter output signal at a converter current that is proportional to the rectified current, a converter voltage that is proportional to the rectified voltage and that is less than the AC voltage;
clamping the converter output signal to a limited voltage; and
generating a regulated output signal based on the limited voltage to drive a load.

19. The method of claim 18, wherein the rectified voltage is N times greater than the converter voltage and the rectified current is N times less than the converter current.

20. The method of claim 19, wherein N is four.

* * * * *